United States Patent
Tevlin

(10) Patent No.: US 10,425,448 B2
(45) Date of Patent: Sep. 24, 2019

(54) END-TO-END DATA PROTECTION

(71) Applicant: Telefonaktiebolaget LM Ericsson (publ), Stockholm (SE)

(72) Inventor: John Tevlin, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 211 days.

(21) Appl. No.: 15/125,360

(22) PCT Filed: Mar. 17, 2014

(86) PCT No.: PCT/EP2014/055281
§ 371 (c)(1),
(2) Date: Sep. 12, 2016

(87) PCT Pub. No.: WO2015/139721
PCT Pub. Date: Sep. 24, 2015

(65) Prior Publication Data
US 2017/0078333 A1 Mar. 16, 2017

(51) Int. Cl.
*H04L 29/06* (2006.01)
*H04W 12/06* (2009.01)

(52) U.S. Cl.
CPC ........ *H04L 63/205* (2013.01); *H04L 63/0876* (2013.01); *H04L 63/0892* (2013.01); *H04W 12/06* (2013.01); *H04L 63/162* (2013.01)

(58) Field of Classification Search
CPC .............. H04L 63/2005; H04L 63/0876; H04L 63/0892; H04L 63/162; H04W 12/06
(Continued)

(56) References Cited

U.S. PATENT DOCUMENTS 7,376,109 B2 * 5/2008 Idehara ................. H04W 88/06
370/329
2006/0026671 A1 2/2006 Potter et al.
(Continued)

OTHER PUBLICATIONS

International Search Report and Written Opinion of the International Searching Authority, Application No. PCT/EP2014/055281, dated Dec. 1, 2014.
(Continued)

*Primary Examiner* — Jahangir Kabir
(74) *Attorney, Agent, or Firm* — Sage Patent Group

(57) ABSTRACT

The present disclosure generally relates to the field of network authentication. More specifically, the present disclosure relates to a technique of determining a set of authentication protocols for authentication between a terminal and an authentication server of a communication network. A method embodiment includes obtaining information related to at least one of the terminal, an access network via which the terminal is connected to the communication network, and at least one gateway node or intermediate network via which the terminal is connected to the communication network. The method further includes determining, based on the obtained information, from a plurality of authentication protocols available for authentication between the terminal and the authentication server, at least one of a set of authentication protocols to be offered towards the terminal and a set of authentication protocols to be supported by the terminal for authentication between the terminal and the authentication server.

17 Claims, 6 Drawing Sheets

(58) Field of Classification Search
USPC .......................................................... 726/2–7
See application file for complete search history.

(56) References Cited

U.S. PATENT DOCUMENTS

| | | | | |
|---|---|---|---|---|
| 2007/0016939 | A1* | 1/2007 | Leibovitz | H04L 63/08 726/3 |
| 2008/0005285 | A1* | 1/2008 | Robinson | H04L 41/0893 709/220 |
| 2008/0295157 | A1 | 11/2008 | Wong et al. | |
| 2008/0298313 | A1* | 12/2008 | Salminen | H04L 63/08 370/329 |
| 2010/0107154 | A1* | 4/2010 | Brahmavar | G06F 11/1433 717/176 |

OTHER PUBLICATIONS

Aboba et al., "Extensible Authentication Protocol (EAP)", Network Working Group, Request for Comments: 3748, Category: Standards Track, Jun. 2004, 67 pp.

Aboba et al., "Extensible Authentication Protocol (EAP) Key Management Framework", Network Working Group, Request for Comments: 5247, Category: Standards Track, Aug. 2008, 79 pp.

* cited by examiner

END-TO-END DATA PROTECTION

CROSS REFERENCE TO RELATED APPLICATION

This application is a 35 U.S.C. § 371 national stage application of PCT International Application No. PCT/EP2014/055281, filed on Mar. 17, 2014, the disclosure and content of which is incorporated by reference herein in its entirety. The above-referenced PCT International Application was published in the English language as International Publication No. WO 2015/139721 A1 on Sep. 24, 2015.

TECHNICAL FIELD

The present disclosure generally relates to the field of network authentication. More specifically, the present disclosure relates to a technique of determining a set of authentication protocols for authentication between a terminal and an authentication server of a communication network.

BACKGROUND

In a typical 3$^{rd}$ Generation Partnership Project (3GPP) Wi-Fi network setup, a User Equipment (UE), an Access Point (AP), an Access Controller (AC), a Wi-Fi Gateway and an Authentication, Authorization and Accounting (AAA)-Server may belong to different operators and may even be located in different networks (e.g., shared networks). This leads to a basic problem that some network components, e.g. the access network (AP/AC) or the Wi-Fi Gateway may be trusted or untrusted, but the UE has no way of knowing or determining this. Some (trusted) network components may be aware of this, but may have no possibility to inform the UE accordingly. In other words, the network being used, or parts thereof, may be trusted or untrusted. From the network perspective, also intermediate network components like the ones mentioned above, and/or the peer (UE) attempting to connect may be trusted or untrusted.

In order to provide a more secure connection between the UE and the network, authentication between the UE and the network has been proposed. Authentication may be regarded as the process of verifying the identity of an entity.

The Extensible Authentication Protocol (EAP) is an authentication framework frequently used in wireless networks and Point-to-Point connections. It is defined in Request for Comments (RFC) 3748 and was updated by RFC 5247. EAP is currently in wide use. For example, in IEEE 802.11 (Wi-Fi) the Wi-Fi Protected Access (WPA) and WPA2 standards have adopted IEEE 802.1X with five EAP types as the official authentication mechanisms.

The EAP standard has no mandatory requirements on end-to-end data encryption. Thus, any plaintext data transmission between the UE and the AAA-Server is open to man-in-the-middle attacks. This basically leaves the subscriber completely open to data/identity theft.

The RFC 3748 describes a simple lock-step (try one-by-one) auto-negotiation of EAP-Types (methods) to initiate Peer Authentication. Currently, approximately 20 EAP methods are defined. The EAP RFC allows up to 253 "standard" methods. It is possible to support more, vendor specific types. For successful authentication, the UE and the network have to agree on an EAP method, which is supported by both. However, even in case of "only" 20 EAP methods, this can be a lengthy and cumbersome procedure.

SUMMARY

Accordingly, there is a need for an improved authentication technique.

According to a first aspect, a method of determining a set of authentication protocols for authentication between a terminal and an authentication server of a communication network is provided. The method comprises the step of obtaining information related to at least one of the terminal, an access network via which the terminal is connected to the communication network, and at least one gateway node or intermediate network via which the terminal is connected to the communication network. The method further comprises the step of determining, based on the obtained information, from a plurality of authentication protocols available for authentication between the terminal and the authentication server, at least one of a set of authentication protocols to be offered towards the terminal and a set of authentication protocols to be supported by the terminal for authentication between the terminal and the authentication server.

In other words, in accordance with the method according to the first aspect, either (i) a set of authentication protocols to be offered towards the terminal for authentication between the terminal and the authentication server or (ii) a set of authentication protocols to be supported by the terminal for authentication between the terminal and the authentication server or both (iii) a set of authentication protocols to be offered towards the terminal for authentication between the terminal and the authentication server and a set of authentication protocols to be supported by the terminal for authentication between the terminal and the authentication server may be determined.

By determining a set of authentication protocols to be offered and/or supported based on the obtained information, the selection of an authentication protocol to be used for authentication may be faster as compared to prior art techniques. Further, a higher level of security may be obtained, as will also be apparent from the detailed description below.

The steps of obtaining and determining may be performed by the terminal or by an entity connected to the terminal. In this way, a set of authentication protocols to be supported by the terminal for authentication may be determined. Such set may, in short, also be referred to as a terminal set of authentication protocols. Alternatively or additionally, the steps of obtaining and determining may be performed by the authentication server or by an entity connected to the authentication server. In this way, a set of authentication protocols to be offered towards the terminal for authentication may be determined. Such set may, in short, also be referred to as a server set of authentication protocols.

For example, if the method is performed by the authentication server or by an entity connected to the authentication server, the step of determining may (only) comprise determining a set of authentication protocols to be offered towards the terminal for authentication between the terminal and the authentication server. Alternatively or additionally, if, for example, the method is performed by the terminal or by an entity connected to the terminal, the step of determining may (only) comprise determining a set of authentication protocols to be supported by the terminal for authentication between the terminal and the authentication server. If, for example, the method is performed by the authentication server or by an entity connected to the authentication server and is performed by the terminal or by an entity connected to the terminal, the step of determining may comprise determining a set of authentication protocols to be offered towards the terminal for authentication and determining a set of authentication protocols to be supported by the terminal for authentication.

The terminal may be any mobile or fixed user-end device (mobile or stationary terminal) such as a User Equipment (UE) in terms of Long Term Evolution (LTE) or Universal Mobile Telecommunications System (UMTS), a mobile station (MS) in terms of Global System for Mobile Communication (GSM) or a station (STA) according to IEEE 802.11 (Wi-Fi) terminology or the like. The access network may be any part of the communication network (e.g., telecommunications network) which connects subscribers to their service provider. The intermediate network may be any network, e.g., transit network, provided between the terminal and the communication network in order to connect the terminal to the communication network.

The authentication server may be any entity providing a service for enabling authentication between the terminal and the authentication server and thus the communication network. The authentication server may comprise or be configured as an Authentication, Authorization and Accounting server (AAA server). Authentication may refer to the process where an entity's identity is authenticated, for example by providing evidence that it holds a specific digital identity such as an identifier and the corresponding credentials. The authorization function may determine whether a particular entity is authorized to perform a given activity, for example inherited from authentication when logging on to an application or service. Accounting may refer to the tracking of network resource consumption by users for the purpose of capacity and trend analysis, cost allocation, billing and the like.

The authentication server may be located in the communication network. For example, in case the authentication server is configured as a 3GPP AAA-server, the AAA-server may be located within the 3GPP Home Public Land Mobile Network (HPLMN). The authentication server may be provided in a core network of the communication network. A core network, or backbone network, may be regarded as the central part of the communication network (e.g., a telecommunication network) that provides various services to customers, such as (mobile) terminals, who are, for example, connected by the access network.

One or more gateway nodes may be present in the core network to access other networks. Alternatively or additionally, one or more gateway nodes may be present between the terminal and the authentication server, e.g., between the terminal and the core network. For example, one or more gateway nodes may be present in the intermediate network. Alternatively or additionally, one or more gateways may be present in the access network.

In accordance with one conceivable realisation of the method according to the first aspect, the step of determining may comprise comparing the obtained information with one or more predefined conditions related to at least one of the terminal, the access network and the at least one gateway node or intermediate network. In accordance with the conceivable realisation, the step of determining may comprise determining at least one of the set of authentication protocols to be offered towards the terminal for authentication and the set of authentication protocols to be supported by the terminal for authentication based on the comparison between the obtained information and the one or more predefined conditions. The one or more predefined conditions may be predefined by an operator of the communication network. The one or more predefined conditions may be adjustable by the operator of the communication network.

At least one of the determined set of authentication protocols to be offered towards the terminal and the determined set of authentication protocols to be supported by the terminal may be empty or may comprise one or more authentication protocols.

The step of determining at least one of the set of authentication protocols to be offered towards the terminal and the set of authentication protocols to be supported by the terminal for authentication may comprise selecting a profile from one or more available profiles based on the obtained information related to at least one of the terminal, the access network and the at least one gateway node or intermediate network. Each of the one or more profiles may comprise a set of authentication protocols to be offered towards the terminal or to be supported by the terminal for authentication.

For example, at least one of the one or more profiles may comprise a set of authentication protocols to be offered towards the terminal for authentication. Such one or more profiles to be offered towards the terminal for authentication may be referred to as one or more server profiles. The one or more server profiles may be stored in the authentication server or may otherwise be accessible by the authentication server. The one or more server profiles may be accessed by the authentication server in order to select one or more server profiles based on the obtained information related to at least one of the terminal, the access network and the at least one gateway node or intermediate network.

Alternatively or additionally, at least one of the one or more profiles may comprise a set of authentication protocols to be supported by the terminal for authentication. Such one or more profiles to be supported by the terminal for authentication may be referred to as one or more terminal profiles. The one or more terminal profiles may be stored in the terminal or may otherwise be accessible by the terminal. The one or more terminal profiles may be accessed by the terminal in order to select one or more terminal profiles based on the obtained information related to at least one of the terminal, the access network and the at least one gateway node or intermediate network.

At least some of the one or more profiles comprising a set of authentication protocols to be offered towards the terminal for authentication may be different from each other. In other words, at least some of the one or more server profiles may comprise different authentication protocols. At least some of the one or more profiles comprising a set of authentication protocols to be supported by the terminal for authentication may be different from each other. In other words, at least some of the one or more terminal profiles may comprise different authentication protocols. For example, at least one of the one or more profiles (independent of whether a server profile and/or a terminal profile) may comprise an empty set of authentication protocols. Alternatively or additionally, at least one of the one or more profiles (independent of whether a server profile and/or a terminal profile) may comprise one or more authentication protocols.

The method may comprise offering one or more authentication protocols contained in the determined set of authentication protocols towards the terminal for authentication. The step of offering may be performed by the authentication server.

The step of offering may comprise successively offering the one or more authentication protocols contained in the determined set of authentication protocols towards the terminal for authentication in accordance with a predetermined priority. The one or more authentication protocols may be offered one after another until one of the authentication protocols is accepted by terminal. The terminal may accept an authentication protocol if it is contained in the selected terminal profile. The predetermined priority may be predefined by a provider of the communication network. The predetermined priority may be changeable by the provider. For example, the determined set of authentication protocols may comprise multiple authentication protocols respectively having different predetermined priorities. In this case, first, the authentication protocol having the highest predetermined priority may be offered, e.g., by the authentication server, towards the terminal for authentication. If, for example the terminal does not support the offered authentication protocol having the highest predetermined priority, the authentication protocol having the second highest predetermined priority may be offered towards the terminal for authentication and so on.

The obtained information related to at least one of the terminal, the access network and the at least one gateway node or intermediate network may comprise at least one of information about the identity of the terminal, information about the identity or type of the at least one gateway node, information about the type of the intermediate network, information about the type of the access network, information about the type of the access between the terminal and the access network, information about the address of the terminal, information about a service set provided in the access network, information about access network advertisements provided and information about beacon frame settings provided in the access network.

For example, if the method according to the first aspect is performed by the authentication server or an entity connected to the authentication server, the obtained information may comprise at least one of information about the identity of the terminal, information about the identity or type of the at least one gateway node, information about the type of the intermediate network, information about the type of the access network, information about the type of the access between the terminal and the access network and information about the address of the terminal.

For example, if the method according to the first aspect is performed by the terminal or an entity connected to the terminal, the obtained information may comprise information about a service set provided in the access network, information about access network advertisements provided and information about beacon frame settings provided in the access network.

According to a second aspect, a method of determining a set of authentication protocols to be offered and supported for authentication between a terminal and an authentication server of a communication network is provided. The method comprises the step of obtaining information related to the access network via which the terminal is connected to the communication network. Further, the method comprises the step of determining, based on the obtained information related to the access network, from a plurality of authentication protocols available for authentication between the terminal and the authentication server, a set of authentication protocols to be supported by the terminal for authentication between the terminal and the authentication server. The method further comprises the step of obtaining information related to at least one of the terminal, the access network, and at least one gateway node or intermediate network via which the terminal is connected to the communication network. The method further comprises determining, based on the obtained information related to at least one of the terminal, the access network, and at least one gateway node or intermediate network via which the terminal is connected to the communication network, from a plurality of authentication protocols available for authentication between the terminal and the authentication server, a set of authentication protocols to be offered towards the terminal for authentication between the terminal and the authentication server.

The first step of obtaining and the first step of determining may be performed by the terminal. The second step of obtaining and the second step of determining may be performed by the authentication server.

The method according to the first aspect and/or the method according to the second aspect may comprise offering, e.g. by the authentication server towards the terminal, an authentication protocol contained in the determined set of authentication protocols to be offered towards the terminal for authentication. The method according to the first aspect and/or the method according to the second aspect may comprise determining, e.g. by the terminal, whether the offered authentication protocol is contained in the set of authentication protocols to be supported by the terminal for authentication.

If it is determined, e.g., by the terminal, that the offered authentication protocol is contained in the set of authentication protocols to be supported by the terminal for authentication, the method may comprise accepting, e.g. by the terminal, the offered authentication protocol.

If it is determined, e.g., by the terminal, that the offered authentication protocol is not contained in the set of authentication protocols to be supported by the terminal for authentication, the method may comprise offering, e.g. by the authentication server towards the terminal, another authentication protocol contained in the determined set of authentication protocols to be offered towards the terminal for authentication.

The plurality of authentication protocols available for authentication may comprise Extensible Authentication Protocol, EAP, methods. For example, the plurality of authentication protocols available for authentication may comprise at least one of: EAP-Transport Layer Security (EAP-TLS), EAP-message-digest (EAP-MD5), EAP-Protected One-Time Password (EAP-POTP), EAP-Pre-Shared Key (EAP-PSK), EAP-password (EAP-PWD), EAP-Tunneled Transport Layer Security (EAP-TTLS), EAP-Internet Key Exchange protocol version 2 (EAP-IKEv2), EAP-Flexible Authentication via Secure Tunneling (EAP-FAST), EAP-Subscriber Identity Module (EAP-SIM), EAP-Authentication and Key Agreement (EAP-AKA), EAP-AKA Prime (EAP-AKA'), EAP-Generic Token Card (EAP-GTC), and EAP-Encrypted key exchange (EAP-EKE).

According to a third aspect, a computer program is provided. The computer program comprises program code portions for performing the steps of any one of the method aspects described herein, when the computer program is run on one or more computing devices. The computer program may be stored on a computer readable recording medium.

According to a fourth aspect, an entity for determining a set of authentication protocols for authentication between a terminal and an authentication server of a communication network may be provided. The entity comprises an obtaining component and a determining component. The obtaining component is configured to obtain information related to at least one of the terminal, an access network via which the terminal is connected to the communication network, and at least one gateway node or intermediate network via which the terminal is connected to the communication network. The determining component is configured to determine, based on the obtained information, from a plurality of authentication protocols available for authentication between the terminal and the authentication server, at least one of a set of authentication protocols to be offered towards the terminal and a set of authentication protocols to be supported by the terminal for authentication between the terminal and the authentication server.

The entity according to the fourth aspect may be configured to perform any one of the method aspects and method steps described herein.

The entity may comprise or may be configured as an authentication server. Alternatively or additionally, the entity may comprise or may be configured as a terminal.

According to a fifth aspect, a system for determining a set of authentication protocols to be offered and supported for authentication between a terminal and an authentication server of a communication network is provided. The system comprises an authentication server as described herein and a terminal as described herein.

The system may be configured to perform the steps of any one of the method aspects and method steps as described herein.

In general, the steps of any one of the method aspects described herein may equally be embodied in one or more suitable components, devices or units, e.g. in suitable components of the authentication server and/or the terminal.

BRIEF DESCRIPTION OF THE DRAWINGS

In the following, the present disclosure will further be described with reference to exemplary embodiments illustrated in the figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, the skilled person will appreciate that the present disclosure may be practiced with authentication methods different from the specific authentication methods discussed below to illustrate the present disclosure. Also, although the present disclosure is described with reference to Wi-Fi Networks, the present disclosure may be practiced in any network to which mobile or stationary users may attach. For example, the present disclosure is applicable to cellular networks such as Global System for Mobile Communications (GSM), Universal Mobile Telecommunications System (UMTS), Long Term Evolution (LTE), LTE-advanced (LTE-a) networks, or to similar wireless networks, but also to wireline networks such as, for example, the Intranet of a company with some or many separated subsidiaries or the Internet. Further, even if in the below a User Equipment (UE) is used as one example of a terminal and an Extensible Authentication Protocol (EAP) Server is used as one example of an authentication server, the present disclosure is not limited thereto.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor.

Figure 1:
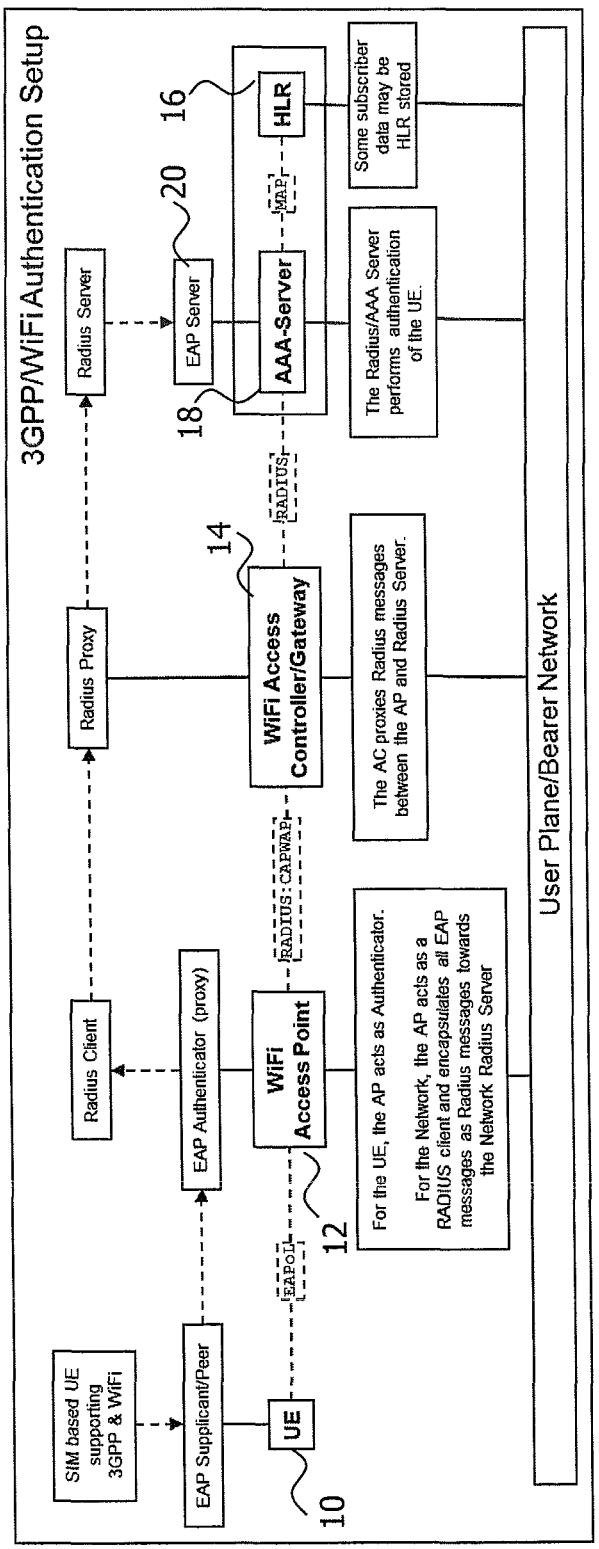
FIG. 1 is a schematic illustration of a typical authentication network setup.

A typical 3GPP Wi-Fi (or just WiFi) network setup is shown in FIG. 1 by way of example. In the Wi-Fi network, a User Equipment (UE) 10, a Wi-Fi Access Point (AP) 12, a Wi-Fi Access Controller (AC), a Wi-Fi Gateway (GW), a Home Location Register (HLR) 16, an Authentication, Authorization and Accounting (AAA) Server 18, and an Extensible Authentication Protocol (EAP) Server 20 are provided. In the exemplary setup of FIG. 1, the AC and the GW are arranged in a common AC/GW entity 14. At least some of the UE 10, the AP 12, the AC/GW entity 14, the AAA-Server 18 and the EAP-Server 20 may belong to different operators and may even be located in different networks, e.g. shared networks.

For example, when only considering the UE 10 and the AAA-Server 18 and the associated EAP Server 20, the network (NW) of the AAA-Server 18 and the associated EAP Server 20 may be trusted or untrusted, but the UE 10 has no way of knowing or determining this. The NW (or the AAA-Server 18/EAP-Server 20) may be aware of this, but has no possibility to inform the UE 10 accordingly. As the EAP standard has no mandatory requirements on end-to-end data encryption, any plaintext data transmission between UE 10 and AAA-Server 18/EAP-Server 20 is open to man-in-the-middle attacks. This basically leaves the subscriber completely open to data/identity theft.

Figure 2:
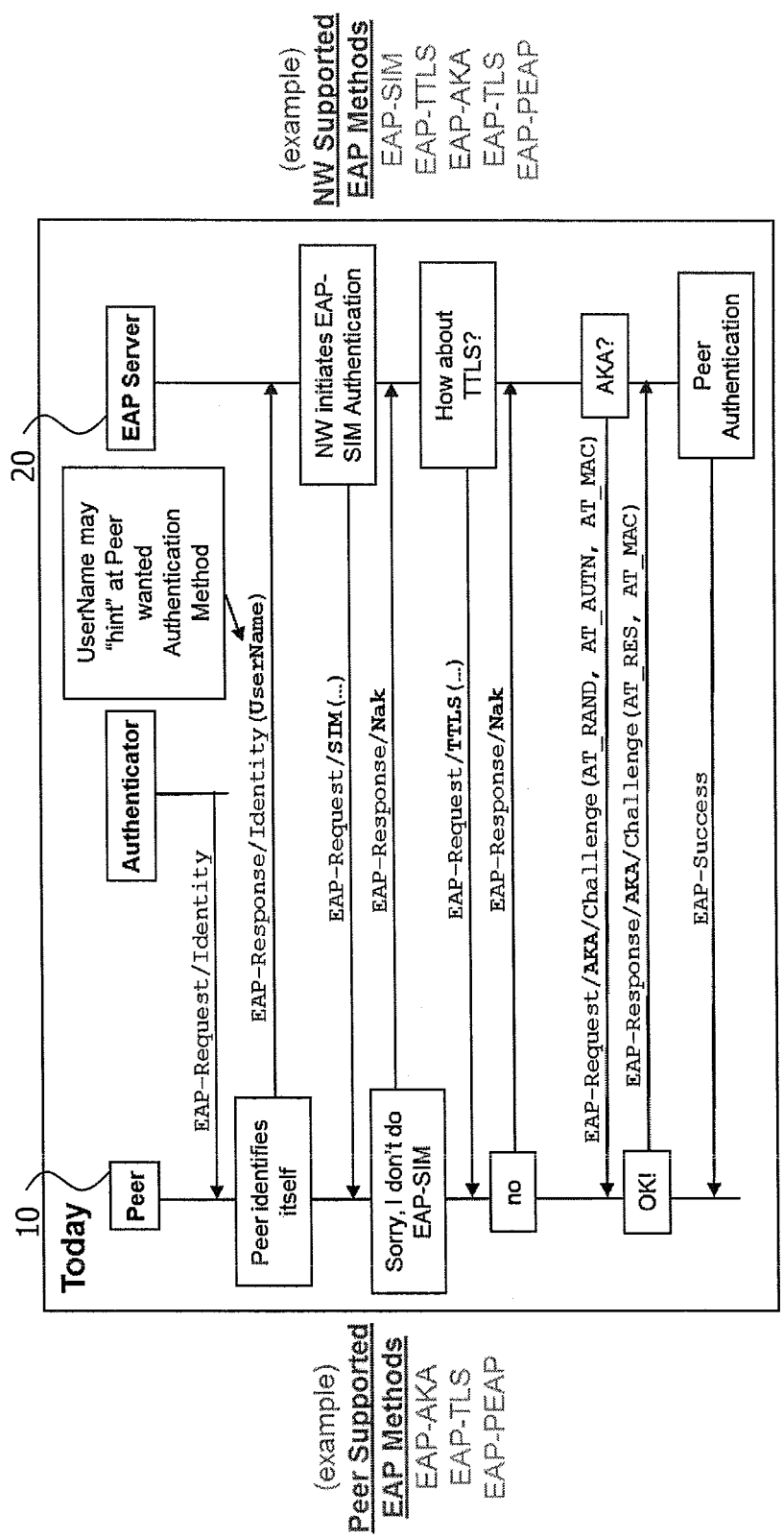
FIG. 2 schematically illustrates an EAP method auto negotiation according to RFC 3748.

A simple lock-step (try one-by-one) auto-negotiation of EAP-Types (methods) to initiate Peer Authentication in accordance with RFC 3748 is schematically shown in FIG. 2 by means of an example authentication call flow.

The UE 10 (which is called peer in FIG. 2), receives an EAP-Request from an Authenticator, the EAP-Request requesting identity information from the UE 10. The UE 10 identifies itself towards the EAP Server 20 by providing the requested identity information in an EAP-Response. A plurality of different EAP protocols is available for authentication between the UE 10 and the EAP Server 20. By way of example it is assumed that the EAP Server 20 initiates EAP-SIM Authentication and transmits a corresponding EAP-Request to the UE 10. According to the example shown in FIG. 2, the UE 10 does not support EAP-SIM Authentication and responds with a Negative-Acknowledgment (NAK or NACK) EAP-Response. Then, the EAP Server 20 tries TTLS and sends out a corresponding EAP-Request. As, by way of example, TTLS is also not supported by the UE

10, the UE sends a NAK response. Finally, the EAP Server 20 offers EAP-AKA, for example, which is supported by the UE 10. Thus, authentication between the UE 10 and the EAP Server 20 can be performed by using EAP-AKA.

As can be seen from the simple example shown in FIG. 2, negotiation of the EAP method to be used for authentication between the UE 10 and the EAP Server 20 can be rather complicated and time consuming. Further, transmitting sensitive information like IMSI, passwords etc. which is required for some EAP methods may be disadvantageous as the communication is not necessarily encrypted and/or intermediate nodes are not trusted from the UE or AAA server perspective.

Figure 3:
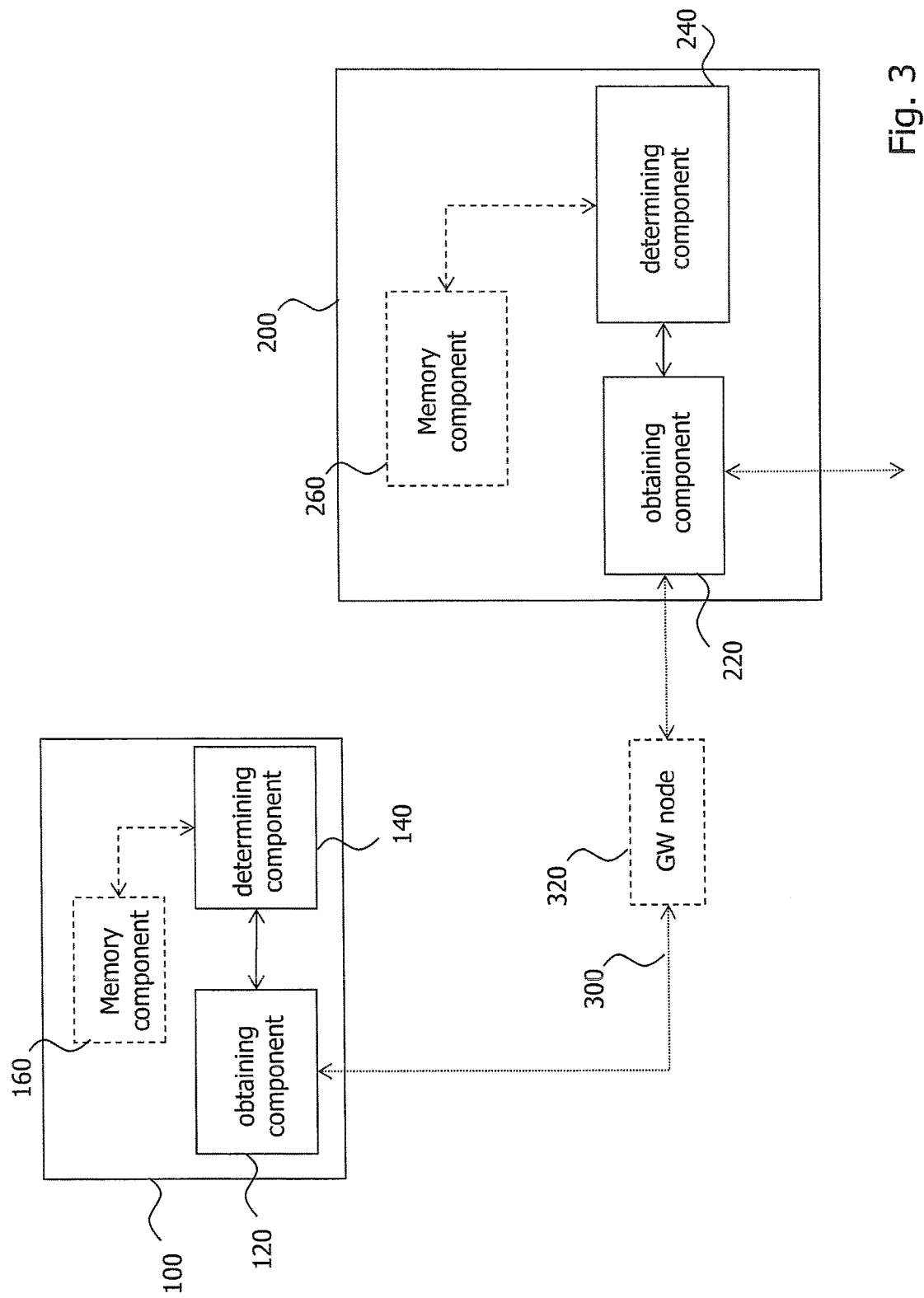
FIG. 3 schematically illustrates a device embodiment of a terminal, a device embodiment of an authentication server, and a system embodiment comprising the device embodiment of the terminal and the device embodiment of the authentication server.

FIG. 3 shows a schematic illustration of a UE 100 according to a device embodiment and an authentication server according to a device embodiment. For sake of explanation rather than limitation, the present disclosure is in the following explained with reference to an EAP server 200 as an example of the authentication server. In the below, The UE 100 and the EAP server 200 can be connected with each other via suitable network components such as one or more gateway (GW) nodes, an intermediate network and/or an access network. By way of example it is assumed in the following for explanation rather than limitation that the UE 100 and the EAP server 200 are connected via an access network 300. Additionally or alternatively, a GW node may be provided between the UE 100 and the EAP Server 200. In FIG. 3 it is assumed by way of example that a GW node 320 is provided in the access network 300.

The UE 100 comprises an obtaining component 120, a determining component 140 and optionally a memory component 160. The EAP server 200 comprises an obtaining component 220, a determining component 240 and optionally a memory component 260.

Figure 4:
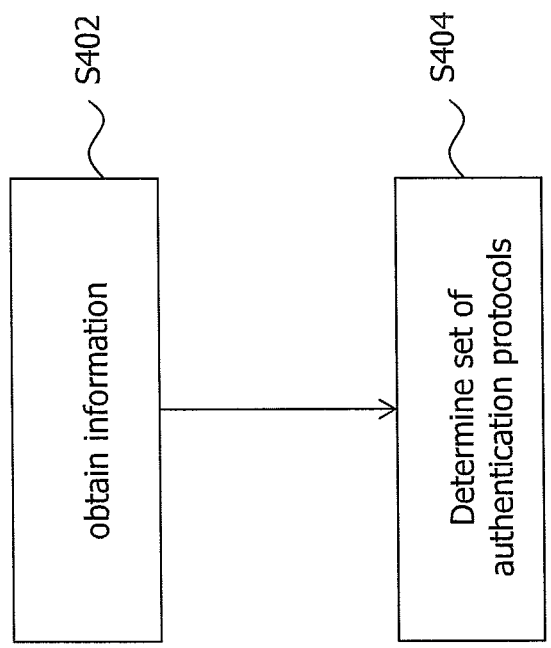
FIG. 4 is a flowchart of a method embodiment which can be implemented in the device embodiment of the terminal and/or the device embodiment of the authentication server.

FIG. 4 shows a flowchart of a method embodiment which may be implemented in the UE 100 and/or in the EAP Server 200.

In general terms, according to the method embodiment of FIG. 4, information related to at least one of the UE 100 and the access network 300 via which the UE 100 is connected to the EAP server 200 is obtained in step S402. Alternatively or additionally to said information, information related to at least one gateway node, e.g., the GW node 320, or intermediate network via which the UE 100 is connected to the EAP Server 200 may be determined.

Then, in step 404, based on the obtained information, at least one of a set of authentication protocols to be offered towards the UE 100 and a set of authentication protocols to be supported by the UE 100 for authentication between the UE 100 and the authentication server 200 are determined from a plurality of authentication protocols available for authentication between the UE 100 and the EAP server 200.

Figure 5:
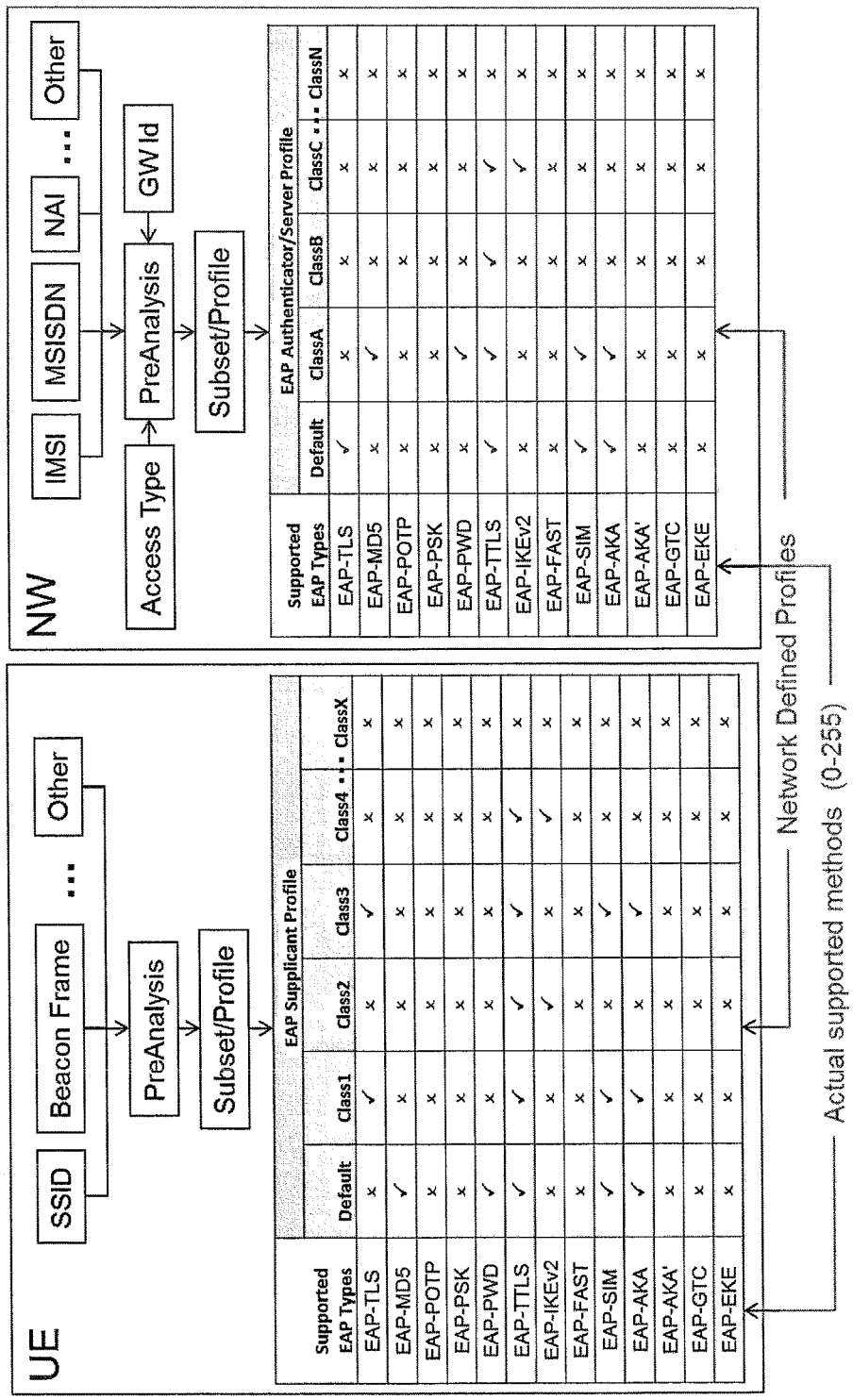
FIG. 5 schematically illustrates profiles of authentication protocols.
Figure 6:
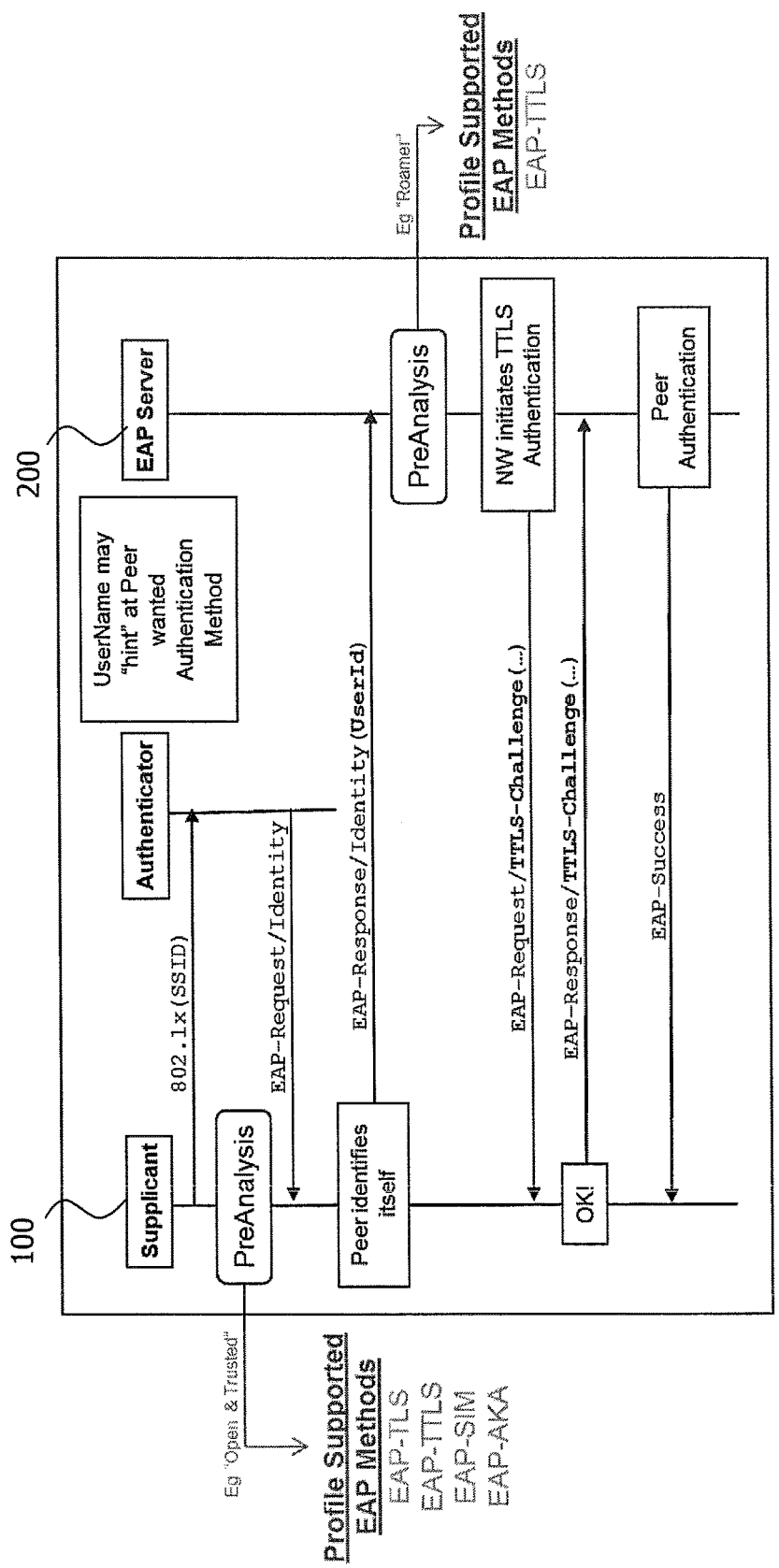
FIG. 6 schematically illustrates a method embodiment of an EAP authentication procedure which can be implemented in the system embodiment of FIG. 3.

As set forth above, the method of FIG. 4 may be implemented in the UE 100 or in the EAP server 200 or in both the UE 100 and the EAP Server 200. In order to illustrate the latter concept of implementing the method in the UE 100 and the EAP Server 200, FIGS. 5 and 6 are in the following explained in more detail. It is to be noted that the profiles and EAP protocols shown in and described with respect to FIGS. 5 and 6 are merely exemplary.

With respect to FIG. 5, the obtaining step S402 and the determining step S404 of FIG. 4 are explained in more detail in relation to one specific implementation example. In FIG. 5, the information obtained in step S402 is analysed in a so-called pre-analysis. Based on the result of said pre-analysis, a specific profile is selected. Such profile contains a set (or subset) of authentication protocols. Several profiles may be provided. For example, as shown in FIG. 5, a plurality of profiles may be provided for the UE 100 (which will be called terminal profiles in the following and are shown on the left side of FIG. 5) and a plurality of profiles may be provided for the EAP Server 200 (which will be called server profiles in the following and are shown on the right side of FIG. 5).

Before the pre-analysis is performed, a network operator can define, for the UE 100, one or more conditions related to information about at least one of the UE 100, the access network 300 and GW node 320 (or any intermediate network via which the UE 100 may be connected to the EAP Server 200). Further, a network operator can define one or more conditions for his authentication setup in the EAP/AAA-Server 200. An example of such setups is shown in FIG. 5 for both the UE 100 and the NW (EAP Server 200). According to FIG. 5, the network operator defines which conditions result in certain authentication protocols to be used. By way of example, the authentication protocols are grouped in certain profiles which will be described in more detail below.

As shown in FIG. 5 by way of example, conditions related to a service set (e.g., service set identification (SSID)) provided in the access network 300 and conditions related to beacon frame settings provided in the access network 300 may be defined by the network operator for the UE 100. In computer networking, a service set is usually a set consisting of all the devices associated with a consumer or enterprise IEEE 802.11 wireless local area network (WLAN). A basic service set (BSS) provides the basic building-block of an 802.11 WLAN. Each BSS is typically identified by a SSID—a 1 to 32 byte string (commonly called the "network name"). Further, other conditions may be defined such as information about access network advertisements provided in the access network 300.

On the NW side, the network operator can define, for the EAP Server 200, one or more conditions related to information about at least one of the UE 100, the access network 300 and GW node 320 (or any intermediate network via which the UE 100 may be connected to the EAP Server 200). For example, as shown in FIG. 5 by way of example, conditions related to the identity of the UE 100 (IMSI, MSISDN and/or NAI), to the identity or type of the at least one GW node 320 (GW Id), and to the type of the access network 300 may be defined by the network operator. In order to determine the identity of the UE 100, the International Mobile Subscriber Identity (IMSI) may be used, which is a unique identification of a user of cellular networks. Alternatively or additionally, the Mobile Subscriber ISDN Number (often referred to as Mobile Station International ISDN Number) (MSISDN) may be used in order to determine the identity of the UE 100. The MSISDN is a number uniquely identifying a subscription in a mobile communication network like a GSM or a UMTS mobile network. Simply put, the MSISDN may be the telephone number to the SIM card in a mobile/cellular phone. Alternatively or additionally, the Network Access Identifier (NAI) may be used to identify the UE 100. The NAI identifies users who request access to a network. The Network Access Identifier (NAI) may be regarded as the user identity submitted by the client during network access authentication. The NAI is, for example, used when roaming, to identify the user. As an identification of the GW node 320, the GW Id may be used. In addition or in the alternative to the above, other conditions may be defined such as information about the type of the intermediate network, information about the type of the access between the UE 100 and the access network 300, and information about the address of the UE 100.

When the conditions are defined by the network operator, one or more of the defined conditions can be used in the pre-analysis. For this purpose, information actually obtained about at least one of the UE 100, the access network 300 and GW node 320 (or any intermediate network via which the UE 100 may be connected to the EAP Server 200) is compared, in the pre-analysis, with the defined conditions. Depending on the result of the comparisons a respective profile is selected which comprises none or one or more authentication protocols. As each defined condition may result in one or more given authentication protocols to be used for authentication in the UE 100 and/or the EAP server 200, the defined conditions may also be referred to as triggers.

To explain further, for the UE 100 (e.g., in the UE 100), for example, a default profile, and profiles for class1 to classX are defined as terminal profiles. The default profile is used when the pre-analysis of the pre-conditions results in no match. For the EAP server 200 (e.g., in the EAP server 200), a default profile, and profiles for classA to classN are defined by way of example as the server profiles. The default profile is used when the pre-analysis of the conditions results in no match. Depending on the defined conditions (triggers), each profile may have a certain meaning, for example, "Roamers", "Own Subscribers", "Untrusted Access", etc. A profile may be construed to define an exclusive, ordered whitelist of EAP authentication methods that shall be offered and/or supported during EAP method auto negotiation. For example, for roamers, only EAP-SIM and/or EAP-AKA may be supported to ensure reliable authentication against another network provider. For own subscribers in untrusted NWs, only EAP-TTLS and/or EAP-TLS may be supported, to ensure end-to-end encryption during authentication. Further, for example, in an "untrusted Network", EAP-SIM and/or EAP-AKA is not used to ensure that the Subscriber's IMSI is not sent.

With reference to FIG. 6, the use of the above-mentioned profiles is explained in more detail. When the UE 100 detects a new Wi-Fi network, it performs a pre-analysis of available information. For example, the UE 100 obtains one or more of the following information: SSID, Network Advertisements, Beacon Frame Settings and the like. Then a pre-analysis is performed by the UE 100 based on one or more of the obtained information. For example, the obtained information is compared with the defined conditions (triggers) and dependent on the matches between the obtained information and the defined conditions, a terminal profile to be used for authentication is selected. No match may result in a default profile. The selected terminal profile comprises the authentication protocols to be supported by the UE 100. In FIG. 6 it is assumed for sake of explanation rather than limitation that the pre-analysis results in the selection of profile class1. Class1 comprises EAP-TLS, EAP-TTLS, EAP-SIM and EAP-AKA as the supported authentication protocols, i.e. these authentication protocols are, in principle, supported by the UE 100.

When the UE 100 connects to the Wi-Fi network, the authenticator request's the UE's identity for authentication. The UE 100 provides its identity, possibly dynamically restricted according to its earlier trigger analysis. Assuming a pass-through authenticator, the EAP-Server 200 receives the user identity and performs a pre-analysis of available information. For this pre-analysis several information elements may be considered, for example: User Identity (e.g., IMSI, MSISDN, or NAI), Wi-Fi Gateway Identity (GW Id), Access Type, Media Access Control (MAC) address of entities such as the GW node 320 and the like.

Then a pre-analysis is performed by the EAP Server 200 based on one or more of the obtained information. This pre-analysis considers the obtained information and compares the obtained information with the defined conditions (triggers). Depending on the matches between the obtained information and the defined conditions, the EAP server 200 dynamically selects a server profile to be offered towards the UE 100. No match may result in a default profile. In FIG. 6 it is assumed for sake of explanation rather than limitation that the pre-analysis results in the selection of server profile classB. ClassB comprises EAP-TTLS as the only authentication protocol to be offered towards the UE 100.

"Normal" EAP authentication can now be performed based upon the selected ("restrictive") server and terminal profiles. As the server profile selected by the EAP Server 200 only comprises EAP-TTLS, the EAP Server 200 offers EAP-TTLS towards the UE 100 for authentication. The UE 100 determines whether the offered authentication protocol is contained in its own selected terminal profile. In the example of FIG. 6, EAP-TTLS is contained in the selected terminal profile so that the UE 100 responds with a EAP-TTLS-based EAP-Response which indicates that EAP-TTLS is supported by the UE 100. As the UE 100 and the EAP Server 200 have agreed on EAP-TTLS to be used for authentication, authentication can be performed based on EAP-TTLS. In this way, the UE 100 and the EAP server 200 have more easily and faster agreed on an EAP protocol to be used to authentication as compared with known methods.

Assuming that the terminal profile does not include EAP-TTLS, the EAP Server 200 would select another EAP protocol included in its selected server profile. The selection can be carried out by considering a predefined priority of the server profiles. If it is assumed that the EAP Server 200 has selected classC rather than classB based on its pre-analysis, classC further includes EAP-IKEv2 (see FIG. 5). Further assuming that EAP-TTLS has a higher priority than EAP-IKEv2, the EAP Server 200 offers first EAP-TTLS to the UE 100. If, for example, the UE 100 has selected classX based on its pre-analysis, the UE 100 determines that EAP-TTLS is not supported and responds accordingly. The EAP server 200 then offers EAP-IKEv2 (having the second highest priority) towards the UE 100. As EAP-IKEv2 is also not contained in classX, the UE 100 responds with a NAK message. Since the EAP server 200 does not have any further EAP protocols to offer, the UE 100 and EAP server 200 do not find a common authentication protocol to be used for authentication. In consequence, the UE 100 will not be able to connect to the network, which increases security.

The invention claimed is:

1. A method, in an apparatus having at least one processor, for determining a set of authentication protocols for authentication between a terminal and an authentication server of a communication network, the method comprising the steps of:

performing by the at least one processor:
obtaining information related to at least one of the terminal, an access network from which the terminal is connected to the communication network, and at least one gateway node or intermediate network from which the terminal is connected to the communication network;

comparing the obtained information with one or more predefined conditions related to at least one of an identity of the terminal, a type of the access network and a type of the at least one gateway node or intermediate network by determining whether the obtained information matches one of the one or more predefined conditions;

responsive to the obtained information matching one of the one or more predefined conditions, selecting, from a plurality of profiles each comprising at least one set of authentication protocols available for authentication, at least one of a set of authentication protocols to use by the authentication server in authenticating the terminal and a set of authentication protocols supported by the terminal for authentication between the terminal and the authentication server; and responsive to the obtained information matching none of the one or more predefined conditions in the comparison between the obtained information and the one or more predefined conditions:

determining a default authentication protocol to use in authentication of the terminal, the default authentication protocol having a lower priority than the plurality of authentication protocols;

offering the default authentication protocol towards the terminal for authentication; and responsive to receiving a Negative Acknowledgement (NAK) message in response to offering the default authentication protocol, stop offering authentication protocols towards the terminal for authentication.

2. The method of claim 1, wherein the steps of obtaining and determining are performed by at least one of the terminal and the authentication server.

3. The method of claim 1, wherein the step of determining at least one of the set of authentication protocols to use by the authentication server in authenticating the terminal and the set of authentication protocols supported by the terminal for authentication comprises selecting a profile from one or more available profiles based on the obtained information related to at least one of the terminal, the access network and the at least one gateway node or intermediate network, each of the one or more profiles comprising a set of authentication protocols used by the authentication server or supported by the terminal for authentication.

4. The method of claim 1, wherein the method further comprises: responsive to selecting the at least one of the set of authentication protocols to use, offering one or more authentication protocols contained in the at least one of the set of authentication protocols towards the terminal for authentication.

5. The method of claim 4, wherein the step of offering comprises offering the one or more authentication protocols contained in the determined set of authentication protocols towards the terminal for authentication in accordance with a predetermined priority.

6. The method of claim 1, wherein the obtained information related to at least one of the terminal, the access network and the at least one gateway node or intermediate network comprises at least one of information about the identity of the terminal, information about the identity or type of the at least one gateway node, information about the type of the intermediate network, information about the type of the access network, information about the type of the access between the terminal and the access network, information about the address of the terminal, information about a service set provided in the access network, information about access network advertisements provided and information about beacon frame settings provided in the access network.

7. A method, in an apparatus having at least one processor, for determining a set of authentication protocols to use to authenticate a terminal and that is supported by the terminal for authentication between the terminal and an authentication server of a communication network, the method comprising the at least one processor performing the steps of:

obtaining information related to the access network from which the terminal is connected to the communication network;

determining, based on the obtained information related to the access network, from a plurality of authentication protocols available for authentication between the terminal and the authentication server, a set of authentication protocols supported by the terminal for authentication between the terminal and the authentication server;

obtaining information related to at least one of the terminal, the access network, and at least one gateway node or intermediate network from which the terminal is connected to the communication network;

comparing the obtained information with one or more predefined conditions related to at least one of an identity of the terminal, a type of the access network and a type of the at least one gateway node or intermediate network by determining whether the obtained information matches one of the one or more predefined conditions;

responsive to the obtained information matching one of the one or more predefined conditions, selecting, from a plurality of profiles each comprising at least one set authentication protocols available for authentication, a set of authentication protocols to use by the terminal in authenticating the terminal; and responsive to the obtained information matching none of the one or more predefined conditions in the comparison between the obtained information and the one or more predefined conditions:

receiving an offering of the default authentication protocol from the authentication server for authentication, wherein default authentication protocol having a lower priority than the plurality of authentication protocols; and sending a Negative Acknowledgement (NAK) message in response to receiving the offering of the default authentication protocol responsive to the terminal not supporting the default authentication protocol.

8. The method of claim 7, wherein the method comprises:
receiving an offering, by the authentication server, of an authentication protocol contained in the determined set of authentication protocols to use by the authentication server in authenticating the terminal; and determining, by the terminal, whether the offered authentication protocol is contained in the set of authentication protocols supported by the terminal for authentication.

9. The method of claim 8, wherein, responsive to when it is determined that the offered authentication protocol is contained in the set of authentication protocols supported by the terminal for authentication, the method comprises accepting, by the terminal, the offered authentication protocol.

10. The method of claim 8, wherein, responsive to when it is determined that the offered authentication protocol is not contained in the set of authentication protocols supported by the terminal for authentication, the method comprises offering, by the authentication server towards the terminal, another authentication protocol contained in the determined set of authentication protocols.

11. The method of claim 1, wherein at least one of the determined set of authentication protocols to use by the authentication server in authenticating the terminal and the determined set of authentication protocols supported by the terminal is empty or comprises one or more authentication protocols.

12. The method of claim 1, wherein the plurality of authentication protocols available for authentication comprises Extensible Authentication Protocol, EAP, methods.

13. The method of claim 12, wherein the plurality of authentication protocols available for authentication comprises at least one of:
EAP-Transport Layer Security, EAP-TLS, EAP-message-digest, EAP-MD5, EAP-Protected One-Time Password, EAP-POTP, EAP-Pre-Shared Key, EAP-PSK, EAP-password, EAP-PWD, EAP-Tunneled Transport Layer Security, EAP-TTLS, EAP-Internet Key Exchange protocol version 2, EAP-IKEv2, EAP-Flexible Authentication via Secure Tunneling, EAP-FAST, EAP-Subscriber Identity Module, EAP-SIM, EAP-Authentication and Key Agreement, EAP-AKA, EAP-AKA Prime, EAP-AKA', EAP-Generic Token Card, EAP-GTC and EAP-Encrypted key exchange, EAP-EKE.

14. A computer program product comprising a non-transitory computer readable storage medium storing program code, which when run on a computer system performs the steps of:
obtaining information related to at least one of the terminal, an access network via from which the terminal is connected to the communication network, and at least one gateway node or intermediate network from which the terminal is connected to the communication network;
comparing the obtained information with one or more predefined conditions related to at least one of an identity of the terminal, a type of the access network and a type of the at least one gateway node or intermediate network by determining whether the obtained information matches one of the one or more predefined conditions;
responsive to the obtained information matching one of the one or more predefined conditions, selecting, from a plurality of profiles each comprising at least one set of authentication protocols available for authentication, at least one of a set of authentication protocols to use by the authentication server in authenticating the terminal and a set of authentication protocols supported by the terminal for authentication between the terminal and the authentication server; and
responsive to the obtained information matching none of the one or more predefined conditions in the comparison between the obtained information and the one or more predefined conditions:
determining a default authentication protocol to use in authentication of the terminal, the default authentication protocol having a lower priority than the plurality of authentication protocols;
offering the default authentication protocol towards the terminal for authentication; and
responsive to receiving a Negative Acknowledgement (NAK) message in response to offering the default authentication protocol, stop offering authentication protocols towards the terminal for authentication.

15. An apparatus for determining a set of authentication protocols for authentication between a terminal and an authentication server of a communication network, the entity comprising:
an obtaining circuit configured to obtain information related to at least one of the terminal, an access network from which the terminal is connected to the communication network, and at least one gateway node or intermediate network from which the terminal is connected to the communication network;
a circuit configured to compare the obtained information with one or more predefined conditions related to at least one of an identity of the terminal, a type of the access network and a type of the at least one gateway node or intermediate node by determining whether the obtained information matches one of the one or more predefined conditions; and
a determining circuit configured to:
responsive to the obtained information matching one of the one or more predefined conditions, select, from a plurality of profiles each comprising at least one set of authentication protocols available for authentication, at least one of a set of authentication protocols to use by the authentication server in authenticating the terminal and a set of authentication protocols supported by the terminal for authentication between the terminal and the authentication server; and
responsive to the obtained information matching none of the one or more predefined conditions in the comparison between the obtained information and the one or more predefined conditions:
determine a default authentication protocol for using in the authentication of the terminal, the default authentication protocol having a lower priority than the plurality of authentication protocols;
offering the default authentication protocol towards the terminal for authentication; and
responsive to receiving a Negative Acknowledgement (NAK) message in response to offering the default authentication protocol, stop offering authentication protocols towards the terminal for authentication.

16. The entity of claim 15, wherein the apparatus comprises an authentication server.

17. The entity of claim 15, wherein the apparatus comprises a terminal.

* * * * *